Dec. 25, 1934.    R. E. KELLER    1,985,503
AUTOMATIC TRANSMISSION
Filed March 3, 1934    5 Sheets-Sheet 3

INVENTOR.
Rex E. Keller.
BY
ATTORNEY.

Dec. 25, 1934.      R. E. KELLER      1,985,503
AUTOMATIC TRANSMISSION
Filed March 3, 1934      5 Sheets-Sheet 4

INVENTOR.
Rex E. Keller.
BY
ATTORNEY.

Patented Dec. 25, 1934

1,985,503

UNITED STATES PATENT OFFICE 1,985,503

AUTOMATIC TRANSMISSION

Rex E. Keller, Beverly Hills, Calif.

Application March 3, 1934, Serial No. 713,819

6 Claims. (Cl. 74—260)

This invention relates to change speed gearing and particularly the application of automatic speed changing mechanism to various types of arrangements for providing variable speed driving connections between a driving shaft and a driven shaft.

As illustrated in the accompanying drawings, an automatic speed changing mechanism including driving and driven clutch members having a centrifugally operable bolt carried by one of said members and operable upon synchronization of the rotative speed of said clutch members for positive locking engagement with the other of said clutch members is provided for effecting changes in the ratio of the driving connection between a driving and a driven shaft, between which shafts planetary gearing is provided for effecting an initial driving connection for initiating the rotation of said driven shaft and the clutch members connected thereto.

A principal object of the invention is to provide a change speed gearing including planetary gear arrangements with automatic speed changing mechanism for effecting changes in the ratio of the driving connection between the driving and the driven shafts together with manually operable means whereby selective changes in the gear ratio may be made without regard to the automatic speed changing mechanism.

Other objects and advantages will be apparent from a reference to the following specification taken in conjunction with the accompanying drawings, of which there are five sheets and in which.

Referring now to Figs. 1 to 8, inclusive, of the drawings, there is shown a transmission indicated generally at 30 and shown as applied to an automotive vehicle having an engine 32, a housing-enclosed clutch mechanism 34, and a driven or propeller shaft 36 adapted to be operatively connected to the rear road wheels of the vehicle.

Figures 1, 2:
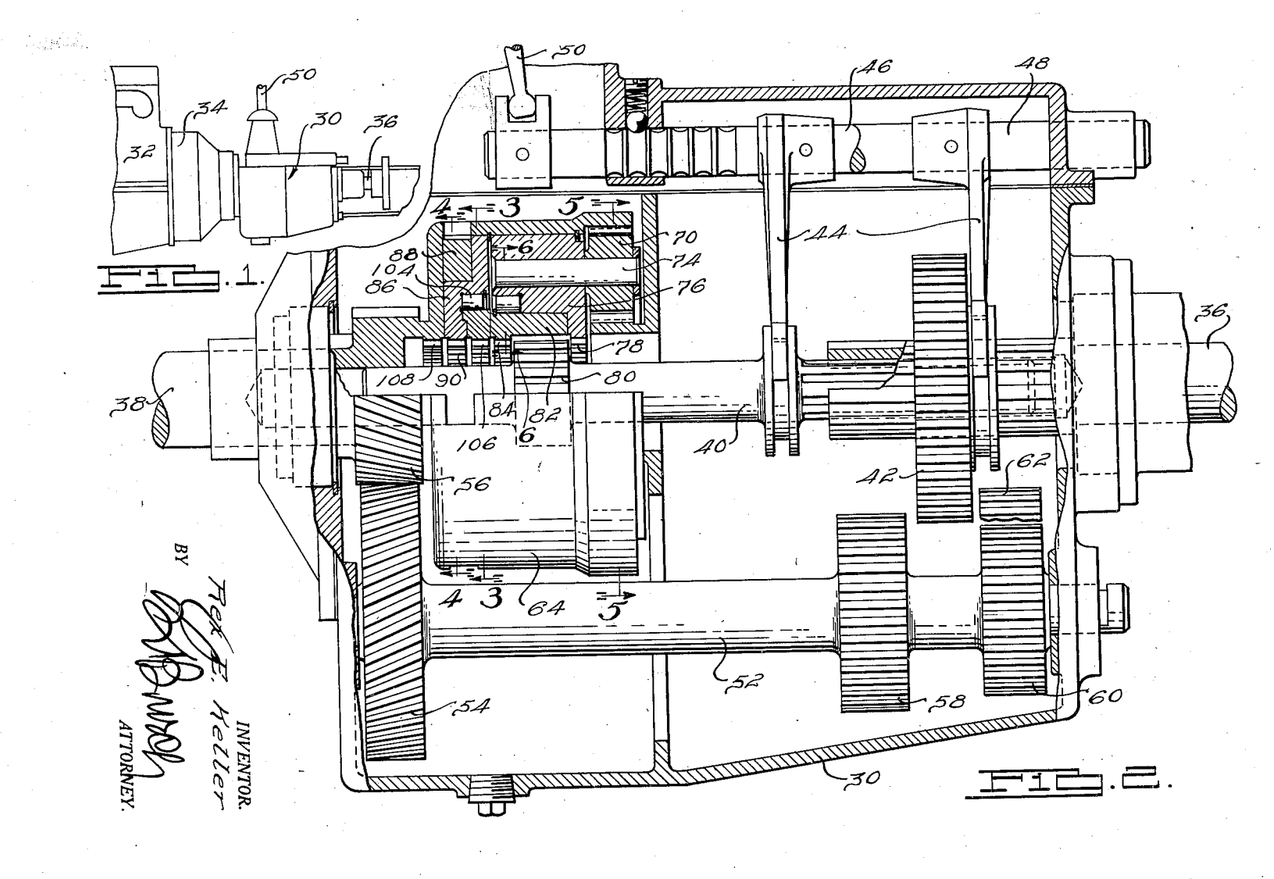
Fig. 1 is a diagrammatic side elevational view of a portion of an automotive vehicle showing the application of a transmission embodying my invention thereto.
Fig. 2 is a longitudinal sectional view of a change speed gearing or transmission and embracing a preferred form of the invention.
Figure 3:
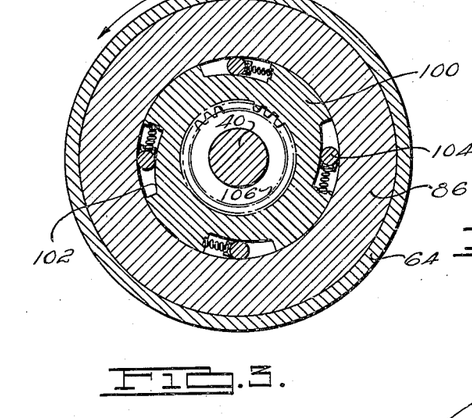
Fig. 3 is a vertical cross sectional view taken in a plane on the line 3—3 of Fig. 2 and illustrating the construction of a free wheeling or overrunning clutch of a type which may be used in transmissions embracing my invention.

The transmission mechanism 30, in general, includes a driving shaft 38 adapted to be operatively connected to the engine of the vehicle by the housing-enclosed clutch mechanism 34, a driven shaft 36, a slidable shaft 40 splined to the driven shaft 36, a slidable gear 42 slidably splined upon the driven shaft 36, yokes or forks 44 for shifting the slidable shaft 40 and the slidable gear 42, shifter rods 46 and 48 carrying the yoke rods and adapted to be moved by a shift lever 50 for shifting the slidable shaft 40 and gear 42 to effect selective changes in the ratio of the driving connection between the driving and the driven shafts, and a countershaft gear cluster 52 having a gear 54 in constant mesh with a gear 56 formed on the end of the driving shaft 38, a gear 58 adapted to be mated with gear 42 when the same is shifted to the left, looking at Fig. 2, to provide a low speed positive driving connection between the driving and the driven shafts, and a gear 60 mating with an idler gear 62 with which the slidable gear 42 is adapted to be mated when the same is shifted to the right, looking at Fig. 2, to provide a reverse driving connection between the driving and the driven shafts.

A drum-shaped driving clutch member 64, provided with a plurality of annularly spaced slotted openings 66, may be formed on the end of the driving shaft 38 and provided with an internal set of teeth 68 at the open end thereof which are in mesh with planet gears 70 mounted to revolve around fixed sun gear 72. The planet gears 70 are mounted upon shafts 74 which are carried by an annular body member 76 mounted for rotation within the drum-shaped driving clutch member 64 and provided with an internal set of teeth 78 adapted to mate with an external set of teeth 80 mounted on the slidable shaft 40 for the purpose of providing a positive or two-way locked-up reduced ratio driving connection between the driving and the driven shafts and through the intermediary of driving clutch member 64, planet gears 70 and the annular body member 76 which may be considered a positive clutch element. Since sun gear 72 is fixed, it will be apparent that the planet gears 74 will revolve about the same at a lower rate of rotation than the drum-shaped driving clutch member 64.

A sleeve 82 journaled within the annular body member 76 is provided with an internal set of teeth 84 and is adapted to be connected to clutch element 76 for rotation therewith in one direction only by a plurality of spring-pressed rollers such as 104, one of which is disposed in each of a plurality of eccentric raceways 87 provided between oppositely disposed surface portions of the sleeve 82 and clutch element 76 so that when shaft 40 is shifted to the left, looking at Fig. 2, to mate teeth 80 thereof with the teeth 84 on the sleeve 82, a one-way or free wheeling driving connection is provided between clutch element 76 and the slidable shaft 40 which will permit the shaft 40 and sleeve 82 to overrun or rotate at a rate in excess of that of the clutch element 76.

Figure 4:
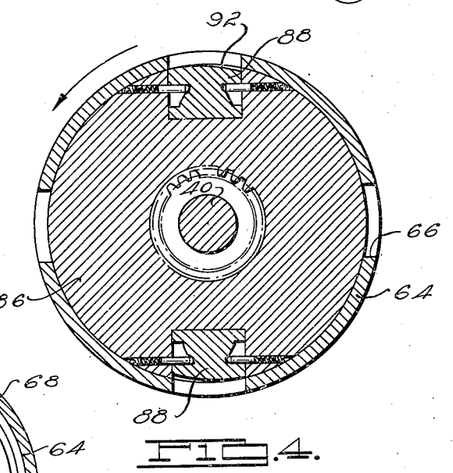
Fig. 4 is a vertical cross sectional view taken in a plane on the line 4—4 of Fig. 2 and illustrating the details of a centrifugally actuated clutch which forms a part of the automatic speed changing mechanism.
Figure 5:
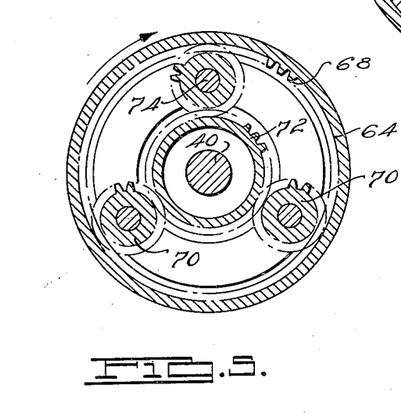
Fig. 5 is a view taken in a plane on the line 5—5 of Fig. 2.
Figure 6:
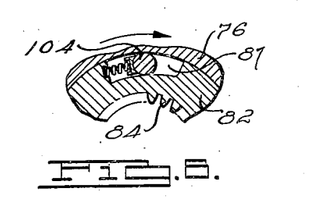
Fig. 6 is a vertical cross sectional view taken in the plane on the line 6—6 of Fig. 2.
Figure 7:
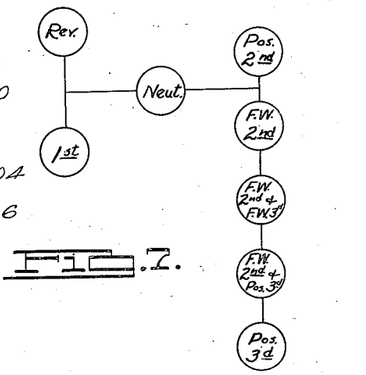
Fig. 7 is a diagrammatic view of the handle position of the manually operable shift lever which is used for selectively effecting changes in the gear ratio of the transmission.
Figure 8:
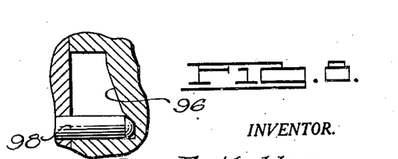
Fig. 8 is an enlarged detail view of a portion of the centrifugally actuated clutch.

A driven or core member 86 of a centrifugally actuated clutch, the driving element of which is provided by the drum-shaped clutch member 64, is rotatably mounted within the same and provided with one or more radially movable bolts 88 which are movable outwardly under the action of centrifugal force resulting from rotation of the core member 86 to positively engage the driving clutch element 64 by extending into the slotted openings 66 therein. The core member 86 is provided with an internal set of teeth 90 which are adapted to mate with the teeth 80 provided on the slidable shaft 40 when the same is shifted to the left, looking at Fig. 2, whereby relative rotation will take place between the driving clutch element 64 and the core 86 when the bolts 88 are in their inner or retracted position, as shown in Fig. 4 of the drawings. The bolts 88 are each provided with a tapered or beveled face 92, which is operable to hold the bolt 88 in its inner or retracted position and out of the slotted openings 66 until the rotative speeds of the core 86 and drum member 64 are approximately synchronous.

When the teeth 80 on shaft 40 are so disposed as to mate with teeth 84 of the free wheeling clutch element 82 and teeth 90 of the centrifugal clutch driven element 86, the same will be rotated at a rate of speed substantially less than that of the driving clutch element 64 so that relative rotation in the direction indicated by the arrow in Fig. 4 will occur between the driving and driven elements of the centrifugally actuated clutch, in which event the tapered surface 92 of the bolt 88 will cause the same to jump the slotted openings 66. However, as soon as the rotative speeds of the core 86 and driving element 64 are synchronized, such as by a temporary closing of the throttle controlling the speed of the engine 32, the core 86 will continue to rotate at the speed at which it was being driven through the planet gears 70 and the driving element 64 of the centrifugally actuated clutch will slow down with the engine, the rollers 86 of the free wheeling clutch permitting the shaft 40, which may be considered as the driven shaft, to overrun the clutch element 76.

When the bolts 88 have been moved into the slotted openings 66 under the influence of centrifugal force resulting from rotation of the core 86, the driven shaft 40 will thereby be locked directly to the driving shaft 38 for rotation therewith. Each of the bolts 88 is provided with a pair of cammed surfaces 96 on which a spring-pressed poppet 98 is adapted to bear for resisting outward movement of the bolts 88 and for retracting the same to their inner position when the centrifugal force of the bolt 88 falls below a predetermined amount.

For the purpose of providing a free wheeling driving connection in automatic direct drive, the core 86 may be provided with a ring 100 between oppositely disposed surfaces of which and the core 86 a plurality of annularly spaced eccentric raceways 102 are provided, in each of which there is disposed a spring-pressed roller 104 operable for providing a one-way driving connection between clutch member 86 and ring 100, the latter of which may be provided with an internal set of teeth 106 with which the toothed portion 80 of the slidable shaft 40 is adapted to be mated so that if the same is not mating with teeth 90 of the clutch element 86, a free wheeling driving connection will be afforded in the automatic driving connection between the driving and the driven shafts.

The gear 56 is internally provided with a set of teeth 108 which are adapted to mate with teeth 80 formed on the slidable shaft 40 when the same is shifted to its extreme lefthand position, looking at Fig. 2, to provide a direct locked-up driving connection between the driving and the driven shafts. It may thus be seen that movement of the shaft 40 to the left to mate progressively with teeth 84, teeth 106, teeth 90, and teeth 108 will successively provide a free wheeling reduced or intermediate driving connection between the driving and the driven shafts, a free wheeling initially intermediate driving connection with an automatic change to a free wheeling direct driving connection, a free wheeling initially intermediate with an automatic change to a positive direct driving connection, and a positive locked-up direct driving connection between the driving and the driven shafts. Movement of the shaft 40 to the right from the position in which it is shown in Fig. 2 of the drawings to mate teeth 80 with teeth 78 will provide a positive intermediate speed driving connection between the driving and the driven shafts. The shift lever 50 may be operated for selectively effecting changes in the gear ratio at any time by the usual method of first disengaging the housing-enclosed clutch mechanism 34 and then shifting the slidable shaft 40 to effect the desired driving connection between the shafts.

Figures 9, 10:
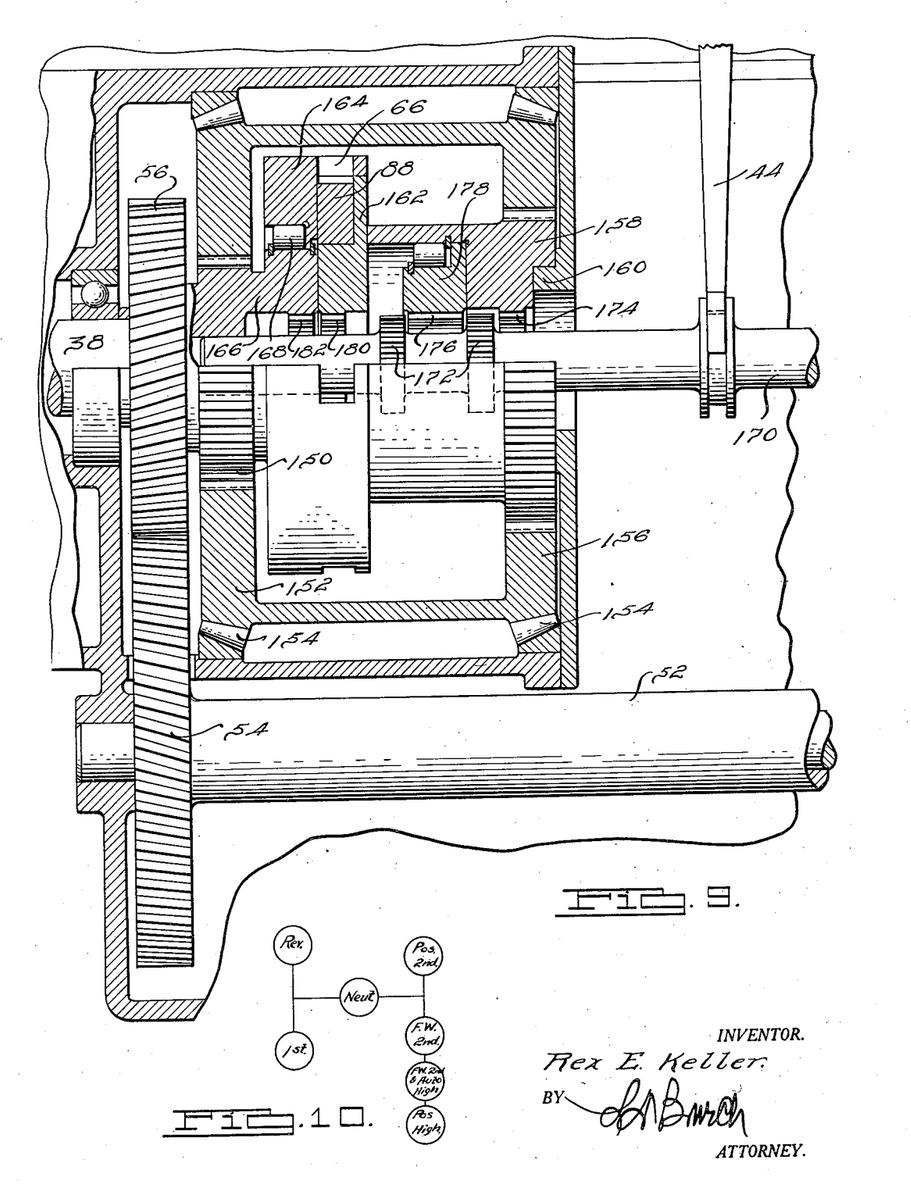
Fig. 9 is a longitudinal view, partly in section, of a modified form of the invention.
Fig. 10 is a diagrammatic view of the handle position of the manual shift lever for the transmission shown in Fig. 9.

In the embodiment shown in Fig. 9, the driving shaft 38 is provided with a gear 150 which is in mesh with an eccentrically mounted internal gear 152 journaled for rotation in roller bearings 154. The gear 152 is integrally connected with a second eccentrically mounted internal gear 156 which is in constant mesh with a gear 158 journaled at one end in a bearing 160 and connected at the other end to the core element 162 of a centrifugally actuated clutch similar to that disclosed in Figs. 2 and 4 and which core member 162 is mounted for rotation within a drum-shaped driving clutch member 164 similar in all respects to the driving clutch element 64. The driving clutch element 164 is mounted upon a hub portion 166 of the gear 50 and is adapted to be connected thereto by free wheeling clutch rollers 168 which form parts of a free wheeling clutch like that disclosed in Fig. 3 of the drawings. In this instance the slidable shaft 170 is provided with a pair of spaced toothed clutch elements 172 which are adapted to be shifted to mate with a set of teeth 174 provided internally on the gear 158 for the purpose of providing a reduced ratio two-way driving connection between the driving and the driven shafts and through the intermediary of gear 150, gear 152, gear 156 and gear 158. Movement of shaft 170 to the left, looking at Fig. 9, to mate one of the toothed clutch elements 172 with an internal set of teeth 176 provided on the driven element 178 of an intermediate speed free wheeling clutch, the driving element of which is provided by a portion of the gear 158 and which clutch in all particulars is identical with that disclosed in Fig. 3 of the drawings, is adapted to provide a one-way or free wheeling intermediate speed driving connection between the driving and the driven shafts. Further movement of the shaft 170 to the left to mate one of the clutch elements 172 with an internal set of teeth 180 provided on the core clutch member 162 will provide an initial free wheeling intermediate speed drive with an automatic change to a direct one-way drive when the bolts 88 are projected into the slotted openings 66. Movement of the shaft 170 to its extreme leftmost position to mate one of the toothed clutch elements 172 with an internal set of teeth 182 internally provided on the hub 166 of the gear 150 will provide a positive locked-up direct driving connection between the driving and the driven shafts.

It will be appreciated that the modification illustrated in Fig. 9 of the drawings may be used in the transmission illustrated in Fig. 2, or in a transmission of any other design which it is desired to use.

Figure 11:
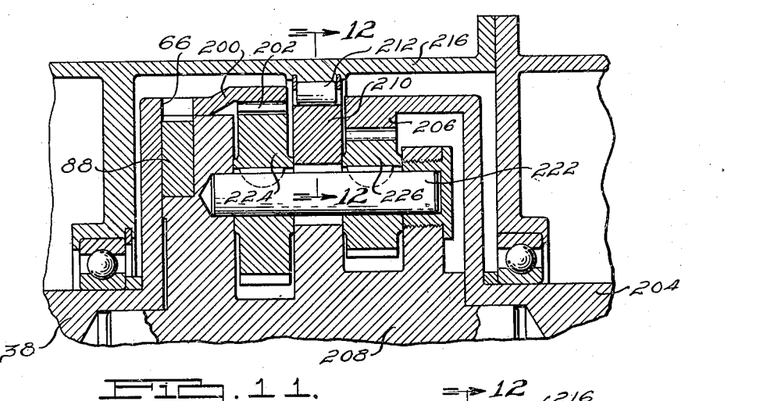
Figs. 11, 13, 14, 15 and 17 are longitudinal vertical sectional views of portions of transmissions embracing my invention and illustrating different modifications thereof.

In the modification illustrated in Fig. 11 of the drawings, the driving shaft 38 is provided with an integral centrifugal clutch driving element 200 similar to driving clutch element 64 and which at the open side thereof is provided with an internal set of teeth 202. The driven shaft 204 is formed at its end to provide an internal gear 206. A planet carrier 208 is freely mounted in the counterbored ends of the driving and driven shafts and is provided with a central web 210 which carries a plurality of annularly spaced spring-pressed rollers 212, disposed within eccentric raceways 214 provided between oppositely disposed surfaces of the web 210 and the case 216 for preventing movement of the web 210 in one direction with respect to the case 216. The case 216 is provided with a positive locking element 218 which is engageable in a notch 220 in the web 210 for preventing rotation of the same in either direction with respect to the case 216. A pinion shaft 222 is carried by the planet carrier 208 and has fixedly connected thereto planet gears 224 and 226 which are adapted to mesh with internal gears 200 and 206 respectively for providing a reduced driving connection between the driving and the driven shafts. Since the planet carrier 208 is held against rotation in one direction, the rotation of the driving clutch element 200 will impart a rotation to the gear 224, pinion 222 and gear 226, which will be communicated to the internal gear 206 to which the driving shaft 204 is connected.

The centrifugally actuated bolts 88 of the centrifugal clutch are carried by the planet carrier 208 and are movable into the slotted openings 66 provided in the driving clutch element 200 for locking the planet carrier 208 to the driving clutch element 200 which will lock the planet gears 224 and 226 against rotation and drive the planet carrier 208 and driven shaft 204 in unison with the driving shaft 38. When the driven shaft 204 is being driven at a reduced rate through the planet gears 224 and 226 and the rotative speed of the driving shaft 38 is cut such as by a closing of the throttle controlling the speed of the engine, the planet carrier 208 will begin to move in a direction indicated by the arrow in Fig. 12 and as the speed of the planet carrier 208 synchronizes with that of the driving clutch element 200, the bolts 88 will be moved outwardly responsive to centrifugal force resulting from rotation of the planet carrier 208 to lock the same to the driving clutch element 200.

Figures 12, 13:
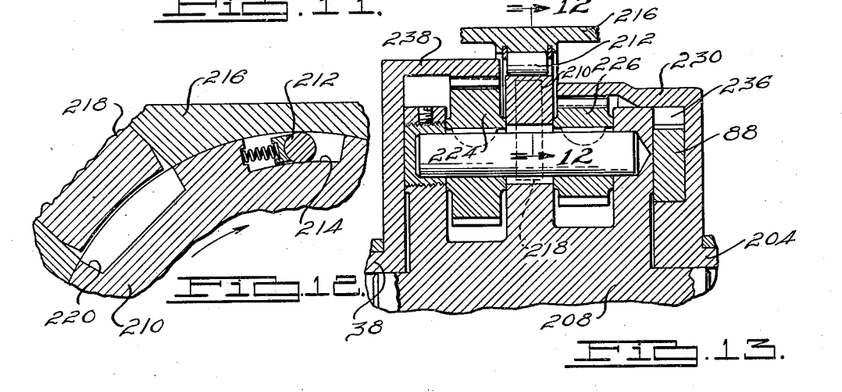
Fig. 12 is a vertical cross sectional view taken in the plane on the line 12—12 of Figs. 11 and 13.

In Fig. 13 a construction similar to that disclosed in Fig. 11 is shown, but differs therefrom in that the drum-shaped clutch element 230, which is directly connected to the driven shaft 204, forms one part of the centrifugally actuated clutch and carries the bolts 88 which are movable outwardly responsive to centrifugal force resulting from rotation of the clutch element 230 to engage in slotted openings provided between lugs 236 formed on the planet carrier 208. In operation, the driving connection through the planetary gears 224 and 226 will continue until the speed of the driving element 238, directly connected to the driving shaft 38 is reduced to initiate a forward rotation of the planet carrier 208, which, when the rotative speed of the same becomes synchronous with that of the clutch element 230 directly connected to the driven shaft 204, will permit the centrifugally actuated bolts 88 to move outwardly into the slotted openings provided between the lugs 236 to lock the planet carrier 208 against rotation, in which event a direct driving connection will be provided between the shafts 38 and 204.

Figure 14:
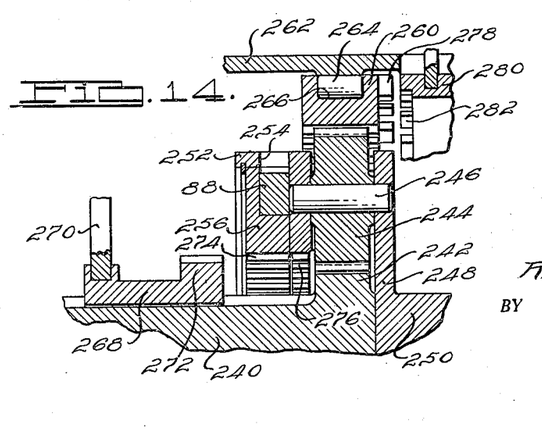

In the modification illustrated in Fig. 14, the driving shaft 240 has a gear 242 provided on the end thereof which is in constant mesh with a plurality of planet gears such as 244 carried on shafts 246, which shafts at one end are supported in an annular flange 248 rotatable with the driven shaft 250 and which shafts at the other end thereof are secured to a drum-shaped clutch element 252, the peripheral surface of which is provided with a plurality of spaced slotted openings 254. A core clutch element 256 nested within the drum-shaped clutch element 252 is provided with a plurality of centrifugally operable bolts 88 which are adapted, upon synchronization of the rotative speed of the core clutch member 256 with the drum-shaped clutch member 252 to be projected into the slotted openings 254 for locking the clutch members for rotation together. The construction of the clutch members 256 and 252 may be similar to that shown in Fig. 4 of the drawings. An internal ring gear 260 is mounted within a casing 262 and secured against relative rotation in one direction with respect thereto by a series of spring-pressed rollers such as 264 which are disposed in eccentric raceways 266 provided between oppositely disposed portions of the casing 262 and gear 260 and of the type illustrated in Fig. 6 of the drawings. A sleeve 268, movable by a manually operable yoke 270, is slidably splined to the driving shaft 240 and provided with a toothed-clutch element 272 which is adapted to be mated with an internal set of teeth 274 provided on the core clutch member 256 so that when the driven shaft 250 is being driven at a reduced rate through the planet gears 244, the core clutch element 256 will rotate with the driving shaft 240 while the drum-shaped clutch element 252 will rotate with the driven shaft 250.

The spring-pressed rollers 264 will permit the ring gear 260 with which the planet gears 244 are in mesh to rotate in the same direction as the driving shaft when the speed of the same is reduced to attain a synchronization of the clutch members 256 and 252. When the bolts 88 are positioned within the slotted openings 254 in the drum-shaped clutch member 252, the planet gears 244 will be locked against rotation about the shaft 246, but will revolve with the ring gear 260 as a unit with the driving and the driven shafts. The drum-shaped clutch member 252 may be provided with an internal set of teeth 276 for mating with the toothed clutch element 272 for effecting a locked-up direct driving connection between the driving and the driven shafts at which time the centrifugally operable bolts 88 will be ineffective for changing the ratio of the driving connection between the driving and the driven shafts. The ring gear 260 may be provided with a set of jaw teeth 278 for locking engagement with a non-rotatable sleeve 280 having a cooperating set of jaw teeth 282 for locking the ring gear 260 against rotation in either direction, which will, in effect, lock the centrifugal clutch against operation since the driven shaft 250 will then slow down with a deceleration of the driving shaft 240.

Figures 15, 16, 17, 18, 19, 20:
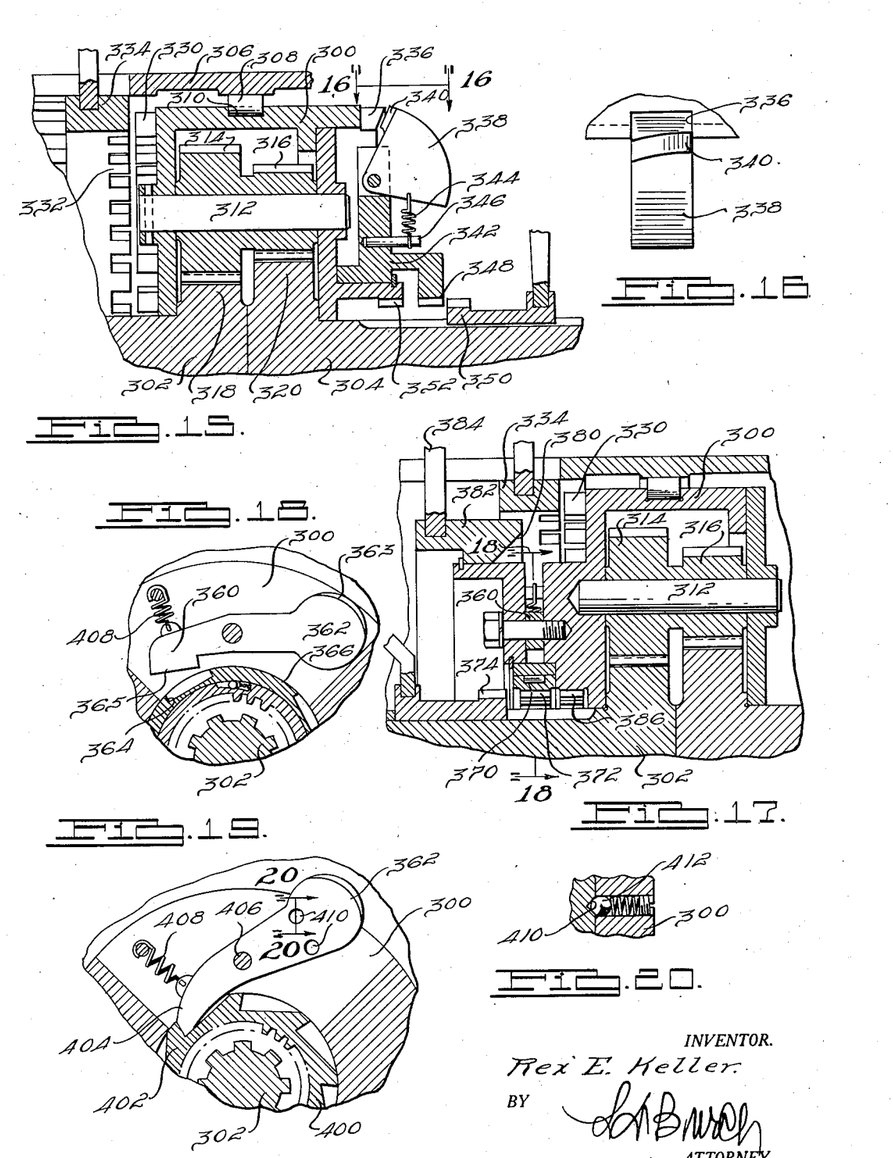
Fig. 16 is a top plan view of the centrifugally actuated bolt used in the embodiment disclosed in Fig. 15 and taken on the line 16—16 thereof.
Fig. 18 is a vertical cross sectional view illustrating one type of centrifugally actuated bolts which may be used in the modification disclosed in Fig. 17.
Fig. 19 is a vertical cross sectional view corresponding with Fig. 18 and illustrating a different type of centrifugally actuated bolt which may be used in the modification illustrated in Fig. 17.
Fig. 20 is a sectional view taken in the plane on the line 20—20 of Fig. 19.

In the modification disclosed in Fig. 15, a planet carrier 300 is freely mounted for rotation on the driving and driven shafts 302 and 304, respectively, and is locked against rotation in one direction with respect to the casing 306 by a plurality of spring-pressed rollers such as 308 disposed in eccentric raceways 310 formed between oppositely disposed surface portions of the planet carrier 300 and the case 306. The planet carrier 300 provides a support for a plurality of shafts 312 upon which there are rotatably mounted planet gears 314 and 316 which are in constant mesh with gears 318 and gears 320 provided on the driving and driven shafts, respectively, for effecting an initial reduced speed driving connection between the driving and the driven shafts 302 and 304, respectively. Rotation of the gear 318 provided on the driving shaft 302 will effect a rotation of the planet gears 314 and 316 about the axis of the shaft 312 upon which they are supported while the planet carrier 300 will remain stationary, being held against rotation by the rollers 308 which will cause a rotation of the driven shaft 304 in the same direction but at a slower rate than that of the driving shaft 302. The planet carrier 300 is provided with a set of jaw teeth 330 which are adapted to be interlocked with a corresponding set of jaw teeth 332 provided on a locking sleeve 334 fixed to the case 306 and slidable for interlocking the jaw teeth to hold the planet carrier 300 against rotation in both directions.

The planet carrier 300 is also provided with a plurality of annularly spaced slotted openings 336 which are adapted to receive a bolt 338 having a tapered surface 340 which is adapted to cause the bolt 338 to jump the slotted openings 336 until the rotative speed of the planet carrier 300 is brought to an approximate synchronous speed with the clutch element 342 to which the bolt 338 is pivoted. A spring 344, secured at one end thereof to the bolt 338 and at the other end thereof to a pin 346 carried by the clutch element 342 is provided for resisting the pivotal movement of the bolt 338 under the action of centrifugal force. The clutch element 342 is provided with an internal set of teeth 348 adapted to mate with a toothed clutch element 350 which is slidably splined to the driven shaft 304 and which is also adapted to mate with an internal set of teeth 352 provided on the planet carrier 300 whereby the same may be locked directly to the driving shaft for rotation therewith.

A forward rotation of the driving shaft 302 is adapted to impart a rotation to the planet gears 314 and 316 about the shaft 312 to provide an initial reduced speed driving connection between the driving and the driven shafts. Subsequent deceleration of the speed of the driving shaft 302 will induce a rotation of the planet carrier 300 in the same direction as that in which the driving shaft 302 rotates, so that as soon as the speed of the planet carrier 300 comes up to the speed of the clutch element 342 which at such time is directly connected to the driven shaft 304 by the toothed clutch element 350, the pivoted bolt 338 will be operative to engage in one of the slotted openings 336 for locking the planet carrier 300 for rotation with the driven shaft 304 whereby the planet gears 314 and 316 will stop rotating about the shaft 312 and will rotate as a unit with the planet carrier 300 about the axis of the driving and the driven shafts for providing a direct driving connection between the same.

In Fig. 17 there is disclosed a similar construction in which a pivoted bolt 360 is carried by the planet gear carrier 300 and provided with a centrifugal weight 362 which is operable for moving the bolt 360 into any one of a plurality of slotted openings or grooves 364 which are provided in a sleeve 366 which forms one element of a free wheeling clutch, the other element of which is provided by a sleeve 370 having a set of internal teeth 372 which are adapted to mate with a toothed clutch element 374 which is slidably splined to the driving shaft 302. The bolt 360 which is pivotally supported on the planet carrier 300 is provided with a surface portion 365 which is operable for holding the bolt 360 out of the slotted openings or grooves 364 until the rotative speeds of the planet carrier 300 and the sleeve 366 are synchronized. Movement of the bolt 360 into the slotted opening 364 is adapted to lock up the planet carrier so that the same will rotate directly as a unit with the driving shaft 302 to provide a direct driving connection between the driving and the driven shafts.

For the purpose of retracting the bolt 360 from engagement with the slotted opening 364 to effect a selective change to a reduced driving connection, the centrifugal weight 362 may be provided with a cammed or beveled surface 363 which is adapted to be acted upon by a cooperating surface 380 provided on a slidable ring 382, the movement of which is controlled by a yoke or fork 384. In this instance the planet carrier is also provided with an internal set of teeth 386 which are adapted to be engaged by the toothed clutch element 374 for the purpose of locking the planet carrier to the driving shaft 302 to provide a locked-up direct driving connection between the driving and the driven shafts.

In Figs. 19 and 20 there is shown a modified form of bolt structure which may be used in the modification shown in Fig. 17 in which a clutch element 400, adapted to be connected to the driving shaft 302 by the toothed clutch element 374 is provided with an external set of ratchet teeth 402 with which a ratchet pawl 404 is engageable for locking the planet carrier 300 directly to the driving shaft 302 to provide a direct driving connection between the driving and the driven shafts. The ratchet pawl 404 is pivotally mounted as at 406 on the planet carrier 300 and is provided with a centrifugal weight such as 362 which is adapted for operating the same responsive to centrifugal force resulting from rotation of the planet carrier 300. Both the bolt 360 and the ratchet pawl 404 are biased by a spring such as 408 out of operative position so that when the planet carrier 300 is stationary, the planet gears 314 and 316 will be free to rotate about their shafts 312 for providing a reduced driving connection between the driving and the driven shafts.

For the purpose of controlling the movement of the centrifugal weights 362 and the pawl 404, the same may be provided with a pair of spaced notches 410 which are adapted to cooperate with a spring-pressed poppet 412 carried by a planet carrier 300 for resisting the movement of the centrifugal weight 362 under the influence of centrifugal force or of the spring 408. The spring-pressed poppet 412 acts on the centrifugal weight 362 to prevent the movement thereof outwardly until the planet carrier 300 attains a predetermined rate of rotation and to prevent the movement of the weight 362 inwardly under the influence of spring 408 until the rotative speed of the planet carrier falls below a predetermined rate which is a lesser rate than that at which the weight is movable outwardly, so that there exists a speed differential between the rates of rotation of the planet carrier at which the centrifugal weight 362 is movable inwardly and outwardly to disconnect and connect the planet carrier with the clutch element 400.

The modifications illustrated in Figs. 11 to 20, inclusive, are particularly adapted for overdrive mechanisms, although it will be appreciated that these constructions may be built into a change speed gearing of the selective type.

While several specific embodiments of the invention have been illustrated and described, it must be appreciated that many modifications may be made in the construction thereof without departing from the scope of the invention, and for that reason I do not desire to be limited to any particular form or arrangement except in so far as such limitations are included in the following claims.

I claim:

1. Transmission mechanism having in combination driving and driven shafts, a drive gear fixed to rotate with said driving shaft, a planetary gear carrier mounted for rotation in the same direction as said driving shaft operatively connected to said driven shaft and relatively rotatable with respect to said drive gear, a planet gear mounted on said carrier and in constant mesh with said drive gear, means acting on said planet gear for inducing a rotation of the same about its axis to provide an initial reduced driving connection between said shafts, and a centrifugally actuated clutch including a clutch element on said carrier, a second clutch element relatively rotatable with respect to said carrier clutch element during said initial driving connection between said shafts, a bolt-engaging recess provided in one of said clutch elements, a bolt carried by the other of said clutch elements movable under the influence of centrifugal force resulting from the rotation thereof to engage in said recess for positively interconnecting said clutch elements to lock said carrier for rotation with said drive gear to provide a change from a reduced to a direct driving connection between said shafts, and means cooperating with said bolt to prevent movement thereof into engagement with said recess until the rotative speeds of said clutch elements are substantially synchronous.

2. Transmission mechanism having in combination driving and driven shafts, a drive gear fixed to rotate with said driving shaft, a planetary gear carrier mounted for rotation in the same direction as said driving shaft operatively connected to said driven shaft and relatively rotatable with respect to said drive gear, a planet gear mounted on said carrier and in constant mesh with said drive gear, means acting on said planet gear for inducing the rotation of the same about its axis to provide an initial reduced driving connection between said shafts, a centrifugally actuated clutch including a clutch element on said carrier, a second clutch element relatively rotatable with respect to said carrier clutch element during said initial driving connection between said shafts, a bolt-engaging recess provided in one of said clutch elements, a bolt carried by the other of said clutch elements movable under the influence of centrifugal force resulting from the rotation thereof to engage in said recess for positively interconnecting said clutch elements to lock said carrier for rotation with said drive gear to provide an automatic change from a reduced to a direct driving connection between said shafts, means cooperating with said bolt to prevent movement thereof into engagement with said recess until the rotative speeds of said clutch elements are substantially synchronized, said bolt being movable out of said recess when the centrifugal force falls below a predetermined amount to disconnect said clutch elements for permitting relative rotation between said drive gear and said planetary carrier for effecting an automatic change from a direct to a reduced driving connection between said shafts, and manually operable means for locking said planet carrier relative to said drive gear to prevent the operation of said centrifugally actuated clutch for effecting automatic changes in the driving connection between said shafts.

3. Transmission mechanism having in combination driving and driven shafts, a drive gear fixed to rotate with said driving shaft, a planetary gear carrier mounted for rotation in the same direction as said driving shaft and operatively connected to said driven shaft, a planet gear mounted on said carrier and in constant mesh with said drive gear, means cooperating with said planet gear for inducing a rotation of the same about its axis upon rotation of said drive gear to provide an initial reduced speed driving connection between said shafts and permitting relative rotation of said carrier with respect to said drive gear, a centrifugally actuated clutch including a clutch element on said carrier, a clutch element relatively rotatable with respect to said carrier clutch element during said initial driving connection between said shafts, a bolt-engaging recess provided in one of said clutch elements, a bolt carried by the other of said clutch elements, movable under the influence of centrifugal force resulting from the rotation thereof to engage in said recess for positively interconnecting said clutch elements to lock said carrier for rotation with said drive gear to provide an automatic change from a reduced to a direct driving connection between said shafts, means cooperating with said bolt to prevent movement thereof into engagement with said recess until the rotative speeds of said clutch elements are substantially synchronous, and spring means opposing the movement of said bolt under the action of centrifugal force and operable for moving said bolt out of said recess when the centrifugal force falls below a predetermined amount to disconnect said clutch elements to permit relative rotation between said drive gear and said planetary carrier for effecting an automatic change from a direct to a reduced speed driving connection between said shafts.

4. Transmission mechanism having in combination driving and driven shafts, a drive gear fixed to rotate with said driving shaft, a planetary gear carrier mounted so as to be capable of rotation in the same direction as said driving shaft and relative rotation with respect to said drive gear, means operatively connecting said carrier to said driven shaft, a planet gear mounted on said carrier and in constant mesh with said drive gear, means cooperating with said planet gear for inducing a rotation of the same about its axis upon rotation of said drive gear to provide an initial reduced speed driving connection between said shafts, a centrifugally actuated clutch including a clutch element fixed for rotation with said carrier, a clutch element relatively rotatable with respect to said carrier clutch element during said initial driving connection between said shafts, a bolt-engaging recess provided in one of said clutch elements, a bolt carried by the other of said clutch elements and movable into and out of engagement with said recess to connect and disconnect said clutch elements responsive to changes in centrifugal force resulting from the rotation of said bolt-carrying clutch element at different rates, movement of said bolt into said recess being adapted to lock said carrier for rotation with said drive gear to provide an automatic change from a reduced to a direct driving connection between said shafts, means cooperating with said bolt to prevent movement thereof into engagement with said recess until the rotative speeds of said clutch elements are substantially synchronized, said bolt being movable out of said recess when the centrifugal force falls below a predetermined amount to disconnect said clutch elements to permit relative rotation between said drive gear and said planetary carrier for effecting an automatic change from a direct to a reduced driving connection between said shafts, and spring-pressed means associated with said bolt and operable for delaying the initial movement of the same in both directions for effecting a difference between the rotative speeds of said bolt-carrying clutch element at which said bolt is movable.

5. Transmission mechanism having in combination driving and driven shafts, a drive gear fixed to rotate with said driving shaft, a planetary gear carrier mounted so as to be capable of rotation in the same direction as and relative to said drive gear, a fixed sun gear, a planetary gear mounted for rotation on said carrier and in constant mesh with said drive gear and said sun gear so as to rotate about its own axis and to revolve with said carrier about the axis of said sun gear upon rotation of said drive gear, a shiftable clutch member operatively connected to said driven shaft and connectable to said carrier to provide an initial driving connection between said shafts, a centrifugally actuated clutch including a clutch element fixed for rotation with said carrier when the same is connected for rotation with said driven shaft, a clutch element provided on said drive gear and having a bolt-engaging recess, a bolt provided on said carrier clutch element movable under the influence of centrifugal force resulting from the rotation thereof to engage in said recess for positively interconnecting said clutch elements to lock said carrier for rotation with said drive gear to provide an automatic change from a reduced to a direct driving connection between said shafts, means cooperating with said bolt to prevent movement thereof into engagement with said recess until the rotative speeds of said clutch elements are substantially synchronized.

6. Transmission mechanism having in combination driving and driven shafts, a drive gear fixed to rotate with said driving shaft, a planetary gear carrier mounted so as to be capable of rotation in the same direction as and relative to said drive gear, a fixed sun gear, a planet gear mounted for rotation on said carrier and in constant mesh with said drive gear and said sun gear so as to rotate about its own axis and to revolve with said carrier about the axis of said sun gear upon rotation of said drive gear, a shiftable clutch member operatively connected to said driven shaft and connectable to said carrier to provide an initial reduced driving connection between said shafts, a centrifugally actuated clutch including a clutch element rotatable with said carrier during said initial driving connection between said shafts and provided with a bolt, a clutch element rotatable with said drive gear and provided with a bolt-engaging recess, said bolt being movable in one direction under the influence of centrifugal force resulting from rotation of said carrier clutch element to engage in said recess for positively interconnecting said clutch elements to lock said carrier for rotation with said drive gear to effect a direct two-way driving connection between said shafts, means cooperating with said bolt to prevent the movement thereof into engagement with said recess until the speeds of said clutch members are substantially synchronized, an overrunning clutch element associated with said carrier clutch element, a positive clutch element on said driving shaft, and means for selectively shifting said shiftable clutch member to engage said overrunning clutch element or said positive clutch element to change the character of said driving connection to a free wheeling drive or to a positive locked-up drive, respectively.

REX E. KELLER.